(12) United States Patent
Cheng et al.

(10) Patent No.: US 11,307,937 B1
(45) Date of Patent: Apr. 19, 2022

(54) EFFICIENT SPACE RECLAMATION IN DEDUPLICATION SYSTEMS

(71) Applicant: Veritas Technologies LLC, Santa Clara, CA (US)

(72) Inventors: Shuai Cheng, Beijing (CN); Xianbo Zhang, Plymouth, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 448 days.

(21) Appl. No.: 15/885,323

(22) Filed: Jan. 31, 2018

(51) Int. Cl.
    *G06F 11/14* (2006.01)
(52) U.S. Cl.
    CPC ...... *G06F 11/1453* (2013.01); *G06F 11/1464* (2013.01); *G06F 11/1469* (2013.01)
(58) Field of Classification Search
    CPC ............. G06F 11/1453; G06F 11/1464; G06F 11/1469
    See application file for complete search history.

(56) References Cited

U.S. PATENT DOCUMENTS

| | | | | |
|---|---|---|---|---|
| 8,041,907 B1* | 10/2011 | Wu | ...................... | G06F 11/1453 707/640 |
| 8,099,571 B1* | 1/2012 | Driscoll | ................ | G06F 3/0613 711/162 |
| 2014/0101113 A1* | 4/2014 | Zhang | ................. | G06F 11/1453 707/692 |
| 2015/0269032 A1* | 9/2015 | Muthyala | .............. | G06F 3/0607 707/639 |

* cited by examiner

*Primary Examiner* — David Yi
*Assistant Examiner* — Alan Otto

(57) ABSTRACT

A method, computer program product, computer system, and the like that provide for the efficient reclamation of storage space in a deduplication system are disclosed. The method, for example, includes identifying one or more storage constructs of a number of storage constructs and generating an indication that a reclamation operation is to be performed with respect to the one or more storage constructs. In an embodiment, each of the plurality of storage constructs includes metadata and a number of units of data. The one or more storage constructs are identified, at least in part, by determining that a portion of the number of units of data of each of the one or more storage constructs is in a state, wherein the determining is based, at least in part, on at least a portion of the metadata.

20 Claims, 11 Drawing Sheets

EFFICIENT SPACE RECLAMATION IN DEDUPLICATION SYSTEMS

FIELD OF THE INVENTION

The present invention relates to deduplication systems and, more particularly, to performing efficient space reclamation in a deduplication system.

DESCRIPTION OF THE RELATED ART

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

SUMMARY OF THE INVENTION

The present disclosure describes methods, computer program products, computer systems, and the like that provide for the efficient reclamation of storage space in a deduplication system. The method, for example, includes identifying one or more storage constructs of a number of storage constructs and generating an indication that a reclamation operation is to be performed with respect to the one or more storage constructs. In an embodiment, each of the plurality of storage constructs includes metadata and a number of units of data. The one or more storage constructs are identified, at least in part, by determining that a portion of the number of units of data of each of the one or more storage constructs is in a state, wherein the determining is based, at least in part, on at least a portion of the metadata.

In certain embodiments, such methods, computer program products, computer systems, and the like can include identifying the number of storage constructs. In such embodiments, the number of storage constructs are among a set of storage constructs stored in a storage system; the number of storage constructs represent one or more backup images; and the one or more backup images were created during one or more full backup cycles. Further, each of the number of storage constructs can be a container, and each of the units of data, a data segment. Further still the one or more full backup cycles can include a number of full backup cycles, where each of the number of full backup cycles includes a full backup and one or more incremental backups.

In certain embodiments, such methods, computer program products, computer systems, and the like can include identifying the one or more backup images, retrieving a number of tuples associated with the one or more backup images, and producing a list of container identifiers, using the number of tuples. Each tuple can be associated with a data segment of the one or more backup images and is one of a number of tuples included in the metadata of a container in which the data segment is stored, and the number of tuples retrieved from the metadata of one or more containers in which the data segments are stored. In such embodiments, each container identifier in the list of container identifiers can identify a container with respect to which a reclamation operation is to be performed.

In certain embodiments, such methods, computer program products, computer systems, and the like can include generating a list of pairs and generating a list of container identifiers. Each pair in the list of pairs includes a container identifier identifying one of the number of containers and container size information indicating a size of the portion of the one of the number of containers. The list of container identifiers is generated based, at least in part, on the list of pairs.

In certain embodiments, such methods, computer program products, computer systems, and the like can include comparing the container size information for the one of the number of containers to a threshold and, in response to a result of the comparing that indicates that the one of the number of containers should be reclaimed, including the container identifier in the list of container identifiers.

In certain embodiments, such methods, computer program products, computer systems, and the like can include sorting the number of tuples, where each tuple of the number of tuples is a triple, and each triple includes a container identifier, a fingerprint of the data segment, and size information. The size information is a size of the data segment. Further, the sorting the number of tuples sorts the number of triples using the container identifier of the each triple as a primary key and the fingerprint of the data segment as a secondary key. The size of the data segment is represented by the fingerprint of the data segment. Further still, the number of tuples can be sorted based, at least in part, on the size information of each of the number of tuples.

In certain embodiments, such methods, computer program products, computer systems, and the like can include, in response to the indication, performing the reclamation operation, where the reclamation operation includes removing the fingerprints for the data segments in each of the one or more containers from a fingerprint cache.

In certain embodiments, such methods, computer program products, computer systems, and the like can include, in response to the indication, excluding the fingerprints for the data segments in each of the one or more containers in a set of fingerprints, where the set of fingerprints are sent to a client as part of a backup operation.

In certain embodiments, such methods, computer program products, computer systems, and the like can include, in response to the indication, performing the reclamation operation. Such a reclamation operation can result in one or both of associated metadata being updated to indicate that the one or more storage constructs no longer contain in-use data, or the one or more storage constructs being deleted. If the associated metadata is updated thusly, the associated metadata is associated with the one or more storage constructs, where the associated metadata is at least one of the metadata of the one or more storage constructs and/or other metadata.

In certain embodiments, such methods, computer program products, computer systems, and the like can include indicating that a deduplication storage server should perform a reclamation operation. The reclamation operation includes the deletion of the one or more storage constructs.

BRIEF DESCRIPTION OF THE DRAWINGS

The present invention may be better understood, and its numerous features and advantages made apparent to those skilled in the art by referencing the accompanying drawings.

Figure 1:
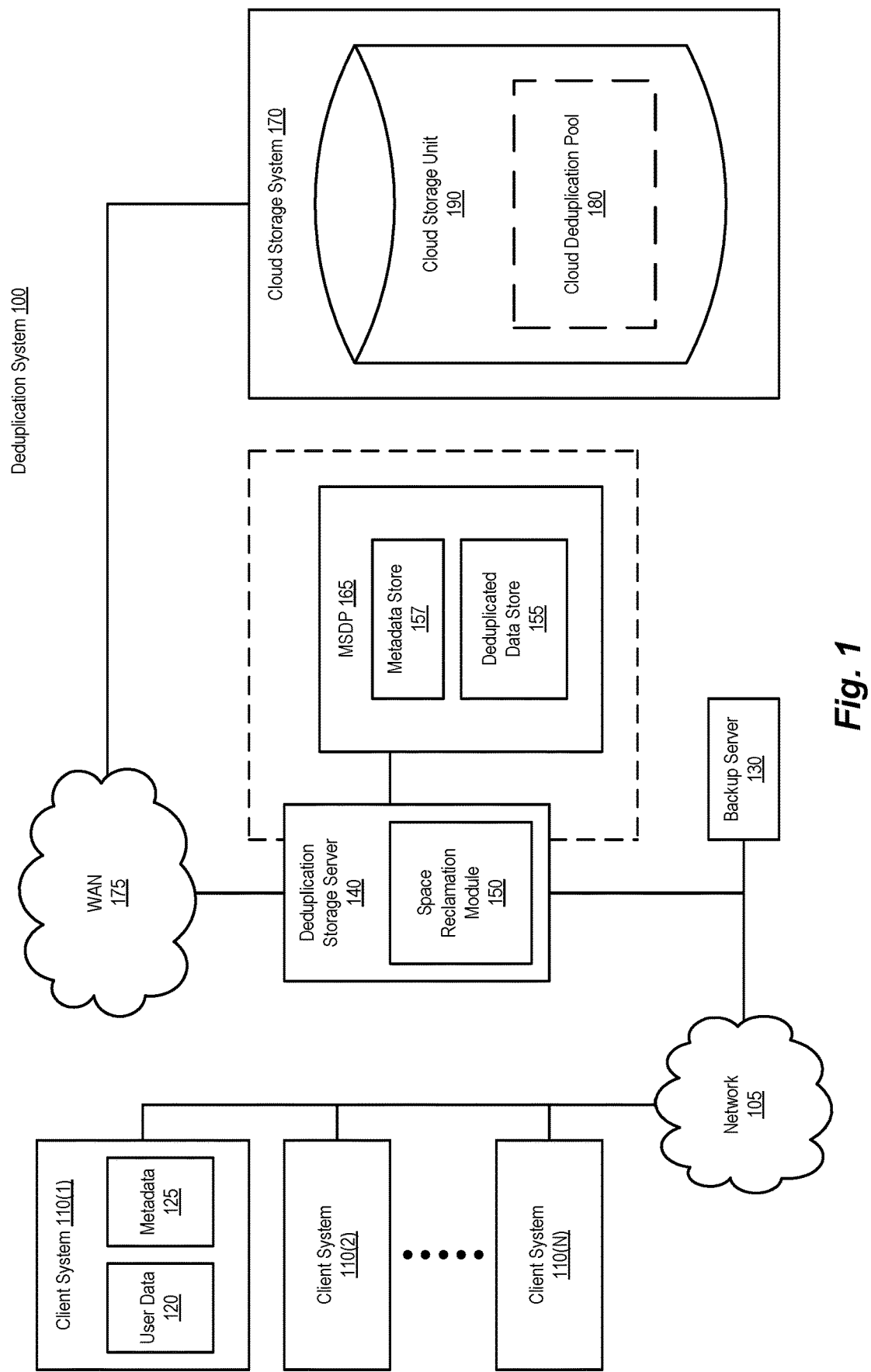
FIG. 1 is a simplified block diagram illustrating an example of components of a deduplication system, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

INTRODUCTION

Methods and systems such as those described herein provide for improved performance of deduplication systems and, more particularly, to efficient space usage in such deduplication systems. Such methods and systems facilitate the optimization and reclamation of storage space by discontinuing the use of a storage construct (e.g., a container or other storage object) by subsequent and/or existing backup images. This can be accomplished, for example, by preventing the use of information contained therein, if the amount of "live" data (data stored in such a storage construct that remains in use (or, conversely, that is not unused)) becomes sufficiently small, such that preferring the use of one or more new containers instead of existing containers becomes an attractive (or at least, acceptable) alternative. This can be viewed as taking into consideration the costs (e.g., in terms of communication bandwidth and storage space) of available alternatives (e.g., sending some number of data segments once again, versus inefficiently storing data segments in a larger-than-necessary number of containers), the decision resting, for example, on whether the effort involved in communicating and storing the affected data segment(s) once again is worthwhile, in view of the costs associated with the excess storage space used by the existing storage structures and the burden such widely-distributed data can have on restoration operations (e.g., in view of the need to retrieve a large number of whole containers to obtain a corresponding small amount of data from each). Certain embodiments, in essence, cease referencing data segments in affected containers (e.g., those having insufficient usage of data segments in recent backup images) in order to increase the probability of removing a whole container (e.g., in cloud or other data container storage), thereby minimizing costs associated with space reclamation.

As will be appreciated, deduplication systems that employ storage solutions such as a media server deduplication pool (MSDP) store storage objects (e.g., containers that store deduplicated data) to local storage. However, such storage objects can also be stored in distributed filesystems, cloud storage, and other non-local (i.e., remote) storage. Unfortunately, such storage objects can become fragmented over time, with in-use and unused units of data (e.g., data segments) interspersed with one another. To address such situations, deduplication systems employ compaction, where the in-use data segments of one or more storage objects are read, and then written to one or more other storage objects, such that the in-use data segments are "compacted" into a smaller number of storage objects. In so doing, such a process stores a higher proportion of in-use data into each storage object, thereby making more efficient use thereof. Old storage objects (that remain after compaction), or those that are empty (e.g., either as the result of compaction or simply no longer containing in-use data segments) can be deleted, for example.

Compaction, unfortunately, does not work well with deduplication pool storage constructs (e.g., storage objects such as containers) stored in remote storage, particularly where such storage constructs must be retrieved (and stored) in their entirety. For example, compaction processes that are performed locally involve downloading the affected containers, in their entirety, from the remote storage system. Once downloaded to the deduplication system, the affected containers are compacted, that then the resulting containers uploaded back to the remote storage system. Such operations clearly make intensive use of network and computing resources, as well as involving significant amounts of time to perform, and so are undesirable. And the potential time (and its unpredictability) involved in waiting for an entire container to become unused, as well as making such determinations, fails to provide a workable solution.

Thus, storage space reclamation techniques according to methods and systems such as those described herein address the aforementioned issues, as well as others, by providing methods and systems that determine the amount of in-use (or conversely, unused) data segments of a given storage object, and based on such a determination, provide an indication that given storage object is to no longer be used (e.g., by removing fingerprints of the data segments therein from a fingerprint cache or the container's metadata, by deleting the container, by filtering fingerprints representing the "deleted" data segments, marking such containers for garbage collection, or other such techniques). In so doing, the deduplication system treats the remaining (in-use) data segments as no longer being stored in the deduplication pool for purposes of future backup operations, which results in the data segments being deduplicated once more (and so, being stored in another container (having improved spatial locality and efficiency of use)). In so doing, methods and systems such as those described herein prefers duplicating a relatively small number of data segments into a new storage construct (e.g., a cloud container or other cloud storage object) when performing a new backup operation, instead of continuing to reference the data segments in an existing storage construct, when maintaining the existing construct is inefficient (e.g., the total size of in-use data segments in a container drops below a threshold). Such an approach reduces storage objects used by a backup image and speeds space reclamation for storage constructs containing a relatively large number of "holes" formed in objects, and in so doing, shortens the life of the storage objects involved. This is the case, for example, because, as time goes on, with fewer and fewer backup images referencing the data segments of a given container, the reclamation of the container (once backup images either reference new containers or are themselves aged out) can be performed (e.g., as part of garbage collection or other deprovisioning operations). As will also be appreciated in light of the present disclosure, whether such deletion/collection is performed for a given container will hinge, of course, on whether the one or more of the existing backup images (or some number of backup images that continue to use the data segments in question) are to be maintained, which depends on the implementation of the given embodiment. In one embodiment, the data segments of existing backup images are maintained in their respective (existing) containers, so that existing backup images are not affected by methods and systems such as those described herein. In that case, old backup images are subject to deletion (or other deprovisioning) in the normal course.

Example Features of a Deduplication System

FIG. 1 is a simplified block diagram illustrating components of an example deduplication system (depicted in FIG. 1 as a deduplication system 100), in which methods and systems of the present disclosure can be implemented. Deduplication system 100 includes a network 105 that communicatively couples one or more client systems 110(1)-(N) (collectively, client systems 110), a backup server 130, and a deduplication storage server 140. As depicted in FIG. 1, deduplication storage server 140 includes a space reclamation module 150 the features and advantages of which are discussed subsequently.

Deduplication storage server 140, in turn, stores deduplicated data in a deduplicated data store (depicted in FIG. 1 as a deduplicated data store 155) and its associated metadata in a metadata store (depicted in FIG. 1 as a metadata store 157). Deduplicated data store 155 and metadata store 157 are stored, for example, in a media server deduplication pool (MSDP) 165. Deduplication storage server 140 is also illustrated as being communicatively coupled to a cloud storage system 170 by a wide-area network (WAN) 175. As will be appreciated in light of the present disclosure, WAN 175 can be any appropriate network or group of networks (e.g., a local area network (LAN) communicatively coupled to the Internet). In one embodiment, cloud storage system 170 supports storage of a cloud deduplication pool 180 in a cloud storage unit 190. As will be also appreciated, while cloud storage unit 190 is discussed and described in the singular herein (as are other comparable components), for the sake of simplicity, cloud storage unit 190 can include a number of storage units, logical and/or physical, and such alternatives and modifications are intended to come within the scope of this disclosure. Each of the foregoing components, as well as alternatives and modifications thereto, are discussed in further detail below.

It will be noted that the variable identifiers such as those used herein (e.g., "N") are used to more simply designate the final element (e.g., client system 110(N)) of a series of related or similar elements (e.g., client systems). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

One or more client systems 110, also referred to herein as client devices 110 and/or client systems 110, can be implemented using, for example, a desktop computer, a laptop computer, a workstation, a server, or the like. An example of such computing devices is described subsequently, in connection with FIG. 10. One or more of client systems 110 can be configured to communicate with backup server 130 and deduplication storage server 140 via network 105. An example of network 105, which can be used by client systems 110 to access backup server 130 and deduplication storage server 140, is a local area network (LAN) utilizing Ethernet, IEEE 802.11x, or some other communications protocol. While FIG. 1 illustrates client system 110(1) including user data 120 and metadata 125, each client system can store different user data 120 and metadata 125 in storage local to client systems 110(1). As will be appreciated in light of the present disclosure, in fact, a wide variety of data, metadata, executable programs, and other such information and software accessible by each of client systems 110 can be the subject of such backup operations.

User data 120 can include various data that is generated and/or consumed by applications, users, and other entities associated with client system 110(1). Moreover, user data 120, in the embodiment shown (as well as others), can also include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of user data 120 may also be transferred to backup server 130 and/or deduplication storage server 140 via a network 105 to be included in a deduplicated data store. Each of client systems 110 can send different user data 120 to backup server 130 and/or deduplication storage server 140.

Metadata 125 includes, for example, information regarding user data 120. Metadata 125 can be generated by client system 110(1), such as during a backup process. Upon an entity (e.g., an application or human user) requesting that client system 110(1) add all or part of user data 120 to a deduplicated data store (e.g., as part of a regularly scheduled full or partial backup), client system 110(1) reads user data 120 and generates metadata 125 regarding user data 120, such as one or more identifiers (e.g., signatures, hashes, fingerprints, or other unique identifiers) that identify different portions of user data 120. Client system 110 can provide metadata 125 as a list (e.g., a list of signatures) to deduplication storage server 140. Metadata 125 can be used by deduplication storage server 140 to determine whether a portion of user data 120 is not duplicative of the data already stored in deduplicated data store 155, and so, should be added to deduplicated data store 155, as further discussed below.

Backup server 130 is also coupled to network 105. Backup server 130 can include one or more physical servers configured to perform a variety of tasks related to the management and implementation of backup services for deduplication system 100, such as performing a full or partial backup of a client system. In the system illustrated in FIG. 1, backup server 130 is further configured to communicate with deduplication storage server 140 for purposes of storing backup images of client systems 110 in resources controlled by deduplication storage server 140. Such communication can be via network 105 or via a direct link between backup server 130 and deduplication storage server 140. Information that can be provided by backup server 130 to deduplication storage server 140 can include a unique identification associated with each data stream provided by one of client systems 110 to deduplication storage server 140. Backup server 130 can also provide sequence number identification to identify sequential data transmitted in each uniquely-identified data stream. Deduplication storage server 140 can then use such information to associate received data streams from client systems 110 in accord with various embodiments, as further discussed below.

Backup services can be implemented in deduplication system 100 as a client-server application (not shown), with a server component (e.g., residing on backup server 130) and a client component (e.g., residing on client system 110(1)) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks therefor, maintaining databases related to files, and other information backed-up from file systems associated with client systems 110, and managing or tracking resources storing backup images for client systems 110.

Deduplication storage server 140 is also coupled to network 105 and performs a variety of tasks related to management and implementation of deduplication services for deduplication system 100. Deduplication storage server 140 can include one or more physical servers configured to perform a variety of tasks related to deduplication services. For example, deduplication storage server 140 can provide deduplication services for eliminating duplicated data content in a backup context. Deduplication services help reduce an amount of storage needed to store backup images of enterprise data (e.g., user data 120) by providing a mechanism for storing a piece of information only once. Thus, in a backup context, if a piece of information is stored in multiple locations within an enterprise (e.g., on multiple client systems 110), that piece of information will only be stored once in a deduplicated backup storage area, such as deduplicated data store 155. Also, if the piece of information does not change between a first backup and a second backup, then that piece of information need not (and in certain embodiments, will not) be stored during the second backup, so long as that piece of information continues to be stored in the deduplicated backup storage area. Data deduplication can also be employed outside of the backup context, thereby reducing the amount of active storage occupied by files containing duplicate data (e.g., in their entirety, or in part).

Deduplication services can be implemented in deduplication system 100 as a client-server application (not shown), with a server component (e.g., residing on deduplication storage server 140) and a client component (e.g., residing on one or more of client systems 110) of the client-server application. For example, during a backup process for storing a backup of user data 120 in deduplicated data store 155, a client component of the deduplication services can be configured to generate metadata 125 regarding user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication storage server 140 is, in turn, communicatively coupled to network storage for deduplicated data that includes deduplicated data store 155 and metadata store 157. Deduplicated data store 155 is a storage area in which deduplicated data can be stored. Deduplicated data store 155 can be configured as single instance storage. In single instance storage, only a single instance of a piece of data is stored. A common use of single instance storage is for maintaining data backup images for servers and other computing clients in a network. For each backup image, only a single instance of duplicate information is stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 157 is a storage area that contains various pieces of information (metadata) regarding deduplicated data, such as information about backup images stored in deduplicated data store 155. The various metadata (including metadata 125) can be stored in a central index. For example, deduplication storage server 140 can use metadata 125, such as the list of signatures from client system 110(1), to determine if portions of a backup image (e.g., portions of user data 120) are non-duplicative of portions already stored in deduplicated data store 155. Once deduplication storage server 140 determines that a portion of user data 120 is not duplicative of the data already stored in deduplicated data store 155 (and thus should be added to deduplicated data store 155), deduplication storage server 140 stores a corresponding identifier, or signature, of the portion of user data 120 in the central index. Deduplication server can request the non-duplicative portions (or unique portions) from client systems 110 by identifying the unique portion with the portion's associated signature. As the unique portions are received via a data stream from client systems 110, the unique portions can be written into a fixed-size container located in memory of deduplication storage server 140, such as a cache. Once the container is full of unique portions, the entire container is written to a location in deduplicated data store 155. The container written to deduplicated data store 155 can also include a local container index, which indicates a local location of each unique portion stored within the container (or other such storage construct). The local container index can contain a signature associated with each unique segment stored in the container, or alternatively can contain a shortened version of the signature of each unique segment stored in the container. Deduplication storage server 140 can store a container identifier (e.g., container ID) of the container in central index as a location for each unique portion in the container. The signature of a unique portion can also be associated with the location of the unique portion in an entry of the central index, where the central index includes an entry for each portion stored in deduplicated data store 155. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Deduplicated data store 155 and metadata store 157 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's OS, for example. Network storage can include a data volume.

Multiple backup images can be stored in deduplicated data store 155. For example, a first backup image can be captured from user data 120 and can be stored in deduplicated data store 155. A subsequent backup image captured from user data 120 can contain duplicate portions that are identical to portions of the first backup image already stored in deduplicated data store 155 and can contain unique portions that are not identical to portions of the first backup image (e.g., portions that correspond to changed user data 120). The unique portions of the subsequent backup image can be written to deduplicated data store 155, while the duplicate portions will not be written (since the duplicate portions are identical to instances of portions already stored in deduplicated data store 155). Since only single instances of portions of a backup image are stored in deduplicated data store 155, metadata store 157 can provide a mapping of a backup image to the various non-duplicative portions stored in deduplicated data store 155 that compose the backup image. Thus, a single backup image can be associated with multiple portions stored throughout deduplicated data store 155, and multiple backup images can be associated with a single portion (e.g., the multiple backup images share the single portion). For example, the subsequent backup image can be associated with unique portions of the subsequent backup image that were written to deduplicated data store 155 and with unique portions of the first backup image that were previously written to deduplicated data store 155. Metadata store 157 can store associations between a backup image and the portions that compose the backup image as a group of references or pointers, where each reference indicates an entry of the central index that corresponds to a portion included in the backup image.

As will be appreciated in light of the present disclosure, in certain embodiments, information such as fingerprints from the central index can be filtered. In such embodiments, deduplication storage server 140 cause clients 110 to send data segments to deduplication storage server 140, which are then stored in containers in cloud deduplication pool 180, for example. By identifying containers in cloud deduplication pool 180 that have become fragmented over time, such embodiments are able to identify data segments in such containers that are still in use, and can cause future backup operations to resend such data segments, allowing such data segments to be store in new containers, and so provide significantly improved locality. In order to accomplish this end, such embodiments (having identified the data segments in question) can filter out the fingerprints of such data segments, when sending fingerprints from the central index to clients. This results in clients 110 sending (essentially, resending) the affected data segment(s) to deduplication storage server 140, for storage in new container(s) in cloud deduplication pool 180. In view of such containers' data segments being subjected to fewer and fewer references by newer and newer backups, such containers will, after some time, cease to be referenced by any current backups, and thus be subjected to garbage collection, deallocation, or similar operation (or, alternatively, to reuse as "empty" containers).

As additional backup images are added to deduplicated data store 155, backup image data can become fragmented across deduplicated data store 155 as portions of changed user data 120 are stored. Thus, a recent backup image stored in deduplicated data store 155 may include portions of recently changed user data 120 contiguously located in deduplicated data store 155, and may include multiple references to previously changed user data associated with older backup images, which are stored in various non-contiguous locations throughout deduplicated data store 155. If a user were to restore the recent backup image from deduplicated data store 155, deduplication storage server 140 would have to read numerous portions of data associated with older backup images from across the various locations (e.g., various containers) that comprise deduplicated data store 155. Thus, as a backup image becomes more fragmented, restoration of the backup image can become more inefficient due to the increasing amount of time spent on performing a growing number of access operations needed to read each portion of data of the backup image from various locations in deduplicated data store 155 (e.g., determining a location for each of the multiple portions from metadata store 157).

In this regard, as noted, the use of compaction for addressing such fragmentation is typically desirable. As noted, deduplication storage server 140 (possibly at the behest of backup server 130, for example) would perform a compaction operation, by reading the remaining ("live") data segments, and writing these data segments either in a more compact arrangement (which might include writing them to their original container or to one of the other containers being compacted) or to a new container. Unfortunately, such reading and writing can be expensive, in terms of network bandwidth, computing resources, and the like. Further, when entire containers must be read and then written to perform such operations (e.g., from and to cloud containers such as those that might be stored, for example, in cloud deduplication pool 180), such problems are only exacerbated.

As an example, deduplication storage server 140, having aggregated data segments into an amount appropriate for storage in a container, will typically move the data segments in question to a container in MSDP 165. From MSDP 165 (or from system memory in deduplication storage server 140), deduplication storage server 140 is then able to move the data segments in their container to cloud storage system 170 via WAN 175. cloud storage system 170 then stores the container in cloud deduplication pool 180, in cloud storage unit 190. As is noted elsewhere here in, the container (or other such storage construct) is stored as a monolithic object in cloud deduplication pool 180. That being the case, search containers are read and written as a single unit, thus exacerbating the aforementioned problems. To address these and other issues, space reclamation module 150 can be employed.

Space reclamation module 150 can be implemented in, for example, deduplication storage server 140, and provides facilities that reduce fragmentation of backup images and improve processing time of restoring a backup image by promoting locality through the reclamation of storage constructs such as containers or other storage objects. Space reclamation module 150 can thus be configured to reclaim containers, such as may contain data segments of one or more recent backup images, by identifying ones of such containers that meet one or more criteria for reclamation. In so doing, operations performed by space reclamation module 150 result in physically dispersed portions of data being brought together by forcing such portions of data to be rewritten into new containers, thereby improving locality of the data segments in question, and improving the efficiency of restoration operations.

To this end, a space reclamation module such as space reclamation module 150, implementing methods and systems such as those described herein, determines the amount of in-use (or conversely, unused) data segments of a given storage object, and based on such a determination, provides an indication that given storage object is to no longer be used, as noted. In one example, such methods and systems facilitate the identification and reclamation of containers stored in a cloud storage system (or other storage scenarios making the use of techniques such as those described herein desirable). Backup images from a number of full backup cycles (e.g., backup images from the last 10 days, assuming a backup cycle is 5 days) are identified, where a full backup cycle is composed of a full backup operation followed by some number of incremental backup operations. As will be appreciated in light of the present disclosure, the determination as to the number of full backup cycles to be examined rests on the question of how many backup cycles are to be supported (the larger number of backup cycles, the larger number of containers, and the slower the affected containers will be reclaimed, typically (assuming that the number of backups kept and the number examined are comparable, which need not be the case, of course)).

From the backup images thus identified, tuples (i.e., a list of values, such as a triple (three values)) representing the data segments therein are obtained. In one embodiment, this includes obtaining the triples of <container identifier, fingerprint, size> of the identified backup images, and sorting the triples obtained based on a primary key of the container identifier, and a secondary key of the fingerprint thereof, where the size is the size of the data segment represented by the fingerprint. This produces a sorted list of triples. Based on this sorted list of triples, pairs corresponding to <container identifier, size> are produced, where the size is the sum of data segment sizes of the container corresponding thereto. Each such pair can the be examined as to the portion of the container having data segments in a given state (e.g., in-use or unused). For example, a list of containers can be generated by comparing a size associated with a given container, to a threshold value. Such a comparison can be in terms of the absolute amount of data in use (or, conversely, unused), a percentage in use (or unused), or the like. Further (and/or alternatively), such an inquiry can be more complex, and include other characteristics of the data, such as frequency of use/access, period of time since last use, average age of the data segments examined, and/or other such characteristics.

A list of containers such as that just described having been generated, a space reclamation module of the deduplication server in question (e.g., space reclamation module 150 of FIG. 1) removes fingerprints associated with the containers listed in the container list, by removing fingerprints with container identifiers in the container list from the fingerprint cache (e.g., a main index cache of a media server deduplication pool). Further, during a given backup operation, pairs of <fingerprint, container identifier> based on data locality can be transferred to clients in order to support fast fingerprint existence querying. Similar to the aforementioned process, fingerprint filtering can be performed. For example, fingerprints with container identifiers in the container list can be removed before passing the fingerprints to a given client. As noted earlier, such filtering (during a subsequent backup operation, e.g.) results in clients such as clients 110 treating the filtered-out fingerprints as missing data segments, which results in those data segments being resent. These newly-sent data segments are then stored (in a smaller number of containers than was previously the case), which improves data locality. This is particularly true as time goes on, as newer backups enjoy better locality and older backups are deleted. Operations such as the foregoing are described in great detail in connection with FIGS. 4-9, and the discussion corresponding thereto.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 155 and/or metadata store 170, and so on.

Figure 2:
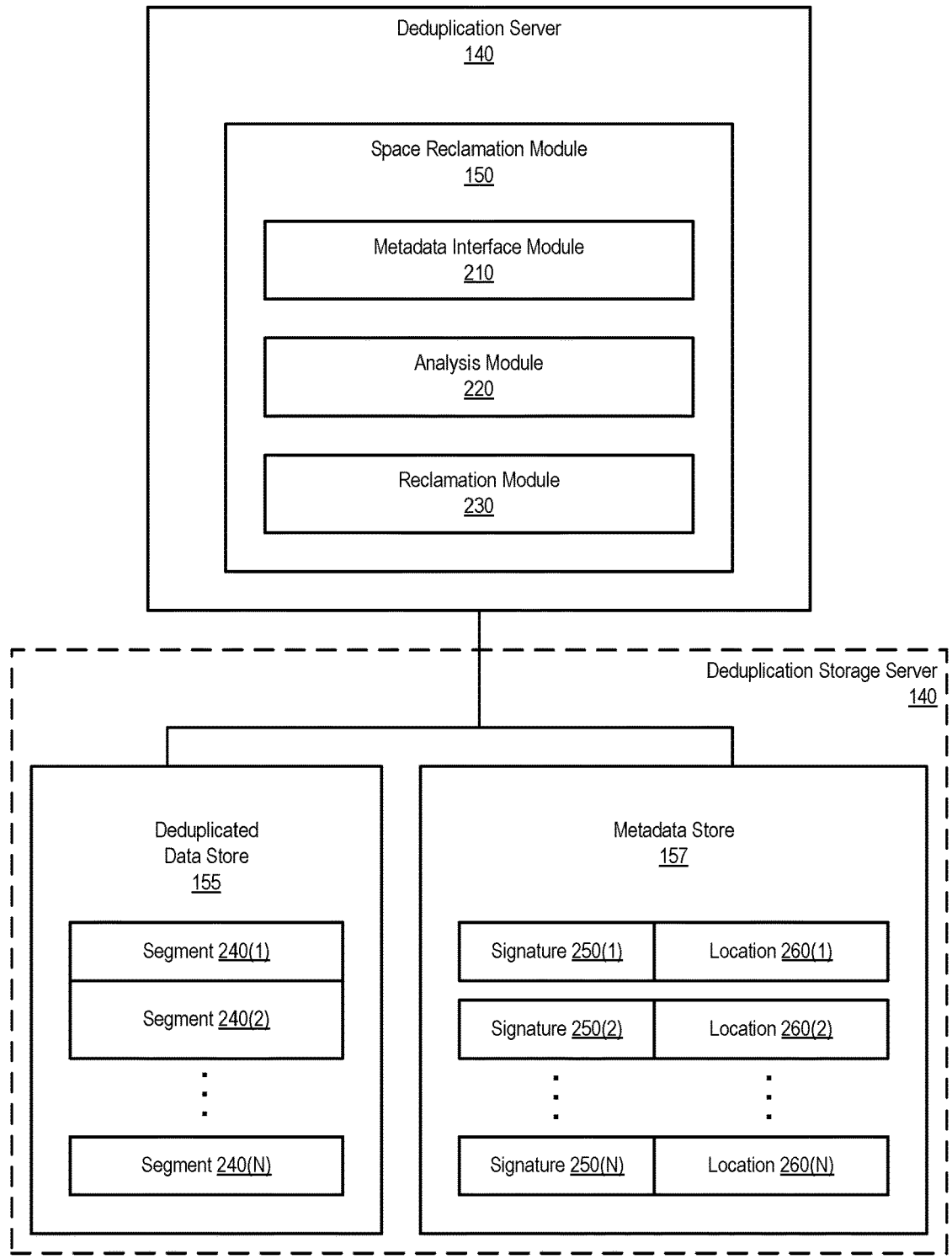
FIG. 2 is a simplified block diagram illustrating an example of certain components of a space reclamation module, according to one embodiment.

FIG. 2 is a simplified block diagram illustrating components of an example of a space reclamation module such as space reclamation module 150. A space reclamation module such as space reclamation module 150 can be implemented in deduplication server 140, as noted, and can include various components, such as a metadata interface module 210, an analysis module 220, and a reclamation module 230, which are discussed in further detail below.

In order to perform data deduplication, a deduplication system needs to be able to identify redundant copies of data (e.g., files, data segments, or other units of data). One way that can provide a reasonable likelihood of finding duplicated instances of data is to divide file data into consistently-sized segments, which are analyzed for duplication in the deduplicated data store. Thus, if only a portion of a large file is modified, then only the segment of data corresponding to that portion of the file need be stored in deduplicated data store 155 and the remainder of the file segments will not be duplicated. In the embodiments described herein, a backup image file can be divided into a plurality of chunks, and each chunk can be divided into a plurality of fixed-size segments.

In the embodiment shown, deduplicated data store 155 includes a set of segments 240(1)-(N) (collectively referred to herein as segments 240) of deduplicated data. Segments 240 can be received from one or more of client systems 110. Typically, each segment 240 is unique (i.e., no two segments stored within segments 240 have the same value). Also, in the embodiment shown, metadata store 157 includes a central index that includes multiple entries, where each entry is associated with a segment. Each entry includes a signature of a set of signatures 250(1)-(N), also referred to herein as signatures 250, and a location of a set of locations 260(1)-(N), also referred to herein as locations 260. Each signature is an identifier of a respective segment 240. For example, signature 250(1) can identify segment 240(1), signature 250(2) can identify segment 240(2), signature 250(N) can identify segment 240(N), and so on. Each location is a location of a respective segment 240. For example, location 260(1) indicates the location of unique segment 240(1), location 260(N) indicates the location of unique segment 240(N), and so on. Each signature 250 of an entry is associated with a location 260 of the entry.

Rather than comparing a segment itself to each segment stored in deduplication data store (which can be enormously time- and processing-prohibitive), detection of duplicative data is usually performed by comparing smaller data signatures of each data segment. Deduplication server 140 uses signatures 250 to determine whether a given segment is already stored in deduplicated data store 155. Each signature 250 can be a checksum or hash value that is calculated based upon data within the segment. In many embodiments, signatures are generated in a manner (e.g., using a cryptographically strong, collision resistant hash function) that produces the same identifier for identical items of data, while also producing different identifiers for non-identical items of data. Regardless of which particular technique is used to generate signatures in deduplication system 100, the same signature-generation technique is implemented by all deduplication clients of deduplication server 140. In one example, signature generation can be performed by deduplication clients (e.g., client software modules running on client systems 110 of FIG. 1). Signatures generated by client software on client systems 110 can be transmitted to deduplication server 140, without also transmitting the segments themselves. In an alternative example, client systems 110 can transmit the segments themselves to deduplication server 140, and deduplication server 140 can use the same signature-generation technique to generate signatures for the segments. However, in such an alternative example, server-side signature generation can consume a greater amount of network resources (e.g., bandwidth) and processing resources (e.g., a processor of deduplication server 140), as compared to client-side signature generation.

By comparing a newly generated signature of a new segment to signatures 250(1)-(N) of segments 240 already stored by deduplication system 100, deduplication server 140 can determine whether to add the new segment to deduplicated data store 155 (e.g., the new segment is a unique segment). In particular, if a new segment's signature does not match any existing signature 250 presently stored in metadata store 157, deduplication server 140 can determine that the new segment is not already stored within segments 240 in deduplicated data store 155. In response, deduplication server 140 can add the new segment to deduplicated data store 155, and add the new signature to metadata store 157. If the new segment has not been received at deduplication server 140, deduplication server 140 can request that client systems 110 transmit the particular segments corresponding to the new signatures that are not present in metadata store 157. Deduplication server 140 use metadata 125 received from client systems 110 (e.g., a list of signatures of the segments) to identify the requested segments to client systems 110 (e.g., identify each requested segment by its corresponding signature). Client systems 110 can transmit the requested segments over network 105 via a data stream.

As the requested segments are received, deduplication server 140 can write the segments into a fixed-size container located in memory of deduplication server 140, such as a cache. Once the container is full, the entire container can be written to a location in deduplicated data store 155, which adds the segments within the container to the set of segments 240 already stored in deduplicated data store 155 (e.g., adding a new segment to deduplicated data store 155 as segment 240(N+1)). As noted, this operation can also be performed with respect to a container (or, depending on the implementation, the data segments stored therein) stored in a cloud deduplication pool such as cloud deduplication pool 180. Deduplication server 140 can generate metadata, such as location 260(1)-(N), that indicates the location of each segment written to deduplicated data store 155. For example, each unique segment can be associated with a location 260 of the particular segment, such as a container identification (container ID) that contains the unique segment. Deduplication server 140 can create a new entry in the central index for a new segment, and can store the segment's location in the new entry. Deduplication server 140 can also add the new signature of a segment to the new entry associated with the corresponding segment. Thus, in the embodiment shown, a new central index entry can contain a new signature 250(N+1) and a new location 260(N+1) that correspond to a new segment 240(N+1) that is stored in deduplicated data store 155.

If a new segment's signature matches an existing signature 250 presently stored in metadata store 157, deduplication server 140 can determine that the new segment is likely to be already stored within segments 240 (e.g., the new segment is a common segment), and thus does not need to be written to deduplication data store 155 (in some situations, such as those in which checksums are used as signatures, this determination may also involve comparing the new segment to the existing segment(s) that are identified by the matching signature).

Metadata store 157 can also include additional information about segments of files (e.g., backup images), such as a mapping of a file to the various unique segments stored in deduplicated data store 155 that compose the file. When unique segments of a file are stored in deduplicated data store 155, deduplication server 140 can create an association between each newly-stored unique segment and the file. The associations can be stored in a catalog table of metadata store 157 as a group of references or pointers, where each reference indicates an entry of the central index that corresponds to a newly-stored unique segment of the file. Since only unique segments of the file are stored in deduplicated data store 155, the duplicative segments of a file are not stored again in deduplicated data store 155. Instead, the file can also be associated with (unique) segments already stored in deduplicated data store 155 that are identical to the (duplicative) segments of the file. Thus, a unique segment can be part of one or more files (e.g., a common segment can be shared among different backup images stored in deduplicated data store 155). The associations between a file and the previously stored unique segments can also be stored in the catalog table as additional references or pointers of the group of references or pointers, where each additional reference indicates an entry of the central index that corresponds to the previously stored unique segment that is identical to a duplicative segment of the file. Thus, each segment of the file corresponds to a unique segment stored in deduplicated data store 155, and a file can be restored using the various unique segments that are associated with the file.

Space reclamation module 150 can include a metadata interface module 210, which can be configured to communicate with metadata store 157 in order to retrieve information about deduplicated data in deduplicated data store 155. Further, metadata interface module 210 can be used to retrieve metadata information from containers in cloud deduplication pool 180, in a similar manner. For example, metadata interface module 210 can access the catalog table and central index to retrieve a file segment listing of a particular file, such as a backup image file. The file segment listing can include a signature 250 (e.g., a fingerprint) and a location 260 (e.g., container ID) of each segment associated with the particular file. Metadata interface module 210 can provide the listing to analysis module 220.

Space reclamation module 150 also includes analysis module 220, which can be configured to perform an analysis of each chunk of a file stored in deduplicated data store 155 and/or containers stored in cloud deduplication pool 180 (e.g., the data segments of a backup image file and information regarding the containers stored in cloud deduplication pool 180, thereby supporting the analysis of such containers with regard to the characteristics described elsewhere herein, such as the amount of in-use data segments contained therein, the proportion of in-use data segments to unused data segments, average age of the data segments stored therein, and so on). Analysis module 220 can receive tuples regarding containers stored in cloud deduplication pool 180 for analysis. Analysis module 220 can perform an analysis on backup images and containers in order to determine which containers might benefit from reclamation, as discussed in further detail below. Once one or more containers are identified, analysis module 220 can provide information regarding the container(s) to reclamation module 230.

Space reclamation module 150 also includes reclamation module 230, which can be configured to reclaim containers in cloud deduplication pool 180. Reclamation module 230 can be configured to communicate with cloud deduplication pool 180 and/or deduplicated data store 155 (as the methods and systems described herein can be applied to those and other storage systems). As noted, containers meeting one or more criteria for reclamation (as indicated by analysis module 220), having been identified thusly, are reclaimed by operations performed by reclamation module 230, such as those described subsequently. Reclamation module 230 can also be configured to update metadata associated with the container(s) in question (e.g., whether filtering fingerprints retrieved from the main index cache, marking fingerprints in a container's metadata as no longer in use, or other such operations, some of which are described subsequently herein). Further, reclamation module 230 can also be configured to delete the container(s) in question. The storage space that is freed, by the deletion of a container, by garbage collection, or by other mechanism, can thus be reclaimed for future use (e.g., future containers) by deduplication server 140.

Figure 3:
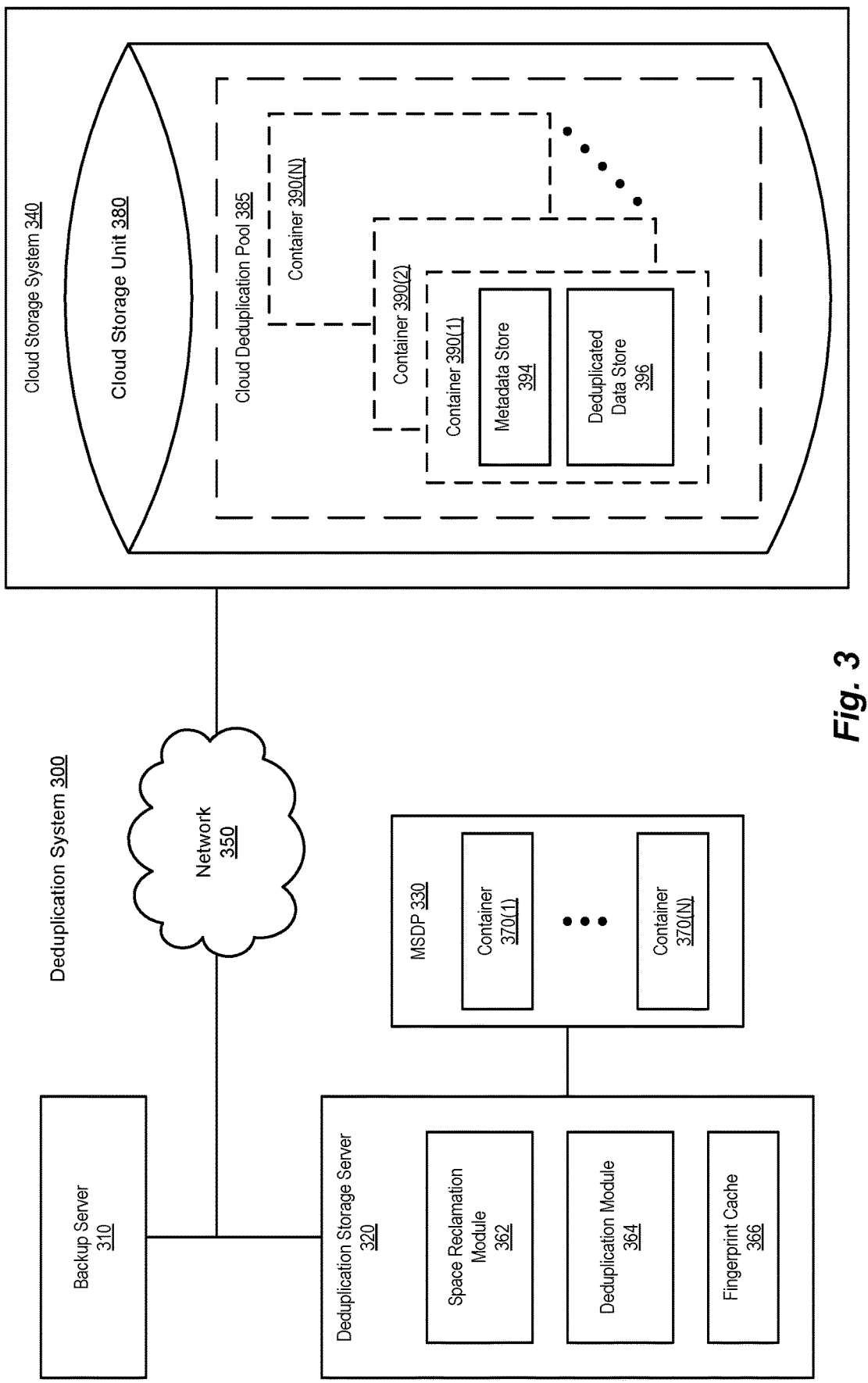
FIG. 3 is a simplified block diagram illustrating an example of components of a deduplication system, according to one embodiment.

FIG. 3 is a simplified block diagram illustrating an example of components of a deduplication system (depicted in FIG. 3 as a deduplication system 300) detailing aspects of cloud storage, according to one embodiment. Deduplication system 300 includes a backup server 310, a deduplication storage server 320, and a media server deduplication pool (MSDP) 330. Backup server 310 and deduplication storage server 320 are coupled to a cloud storage system 340 via a network 350. As depicted in FIG. 3, deduplication storage server 320 includes a space reclamation module 362, a deduplication module 364, and a fingerprint cache 366. As noted, deduplication storage server 320 is coupled to MSDP 330, which can be accomplished byway of network communications or the like. MSDP 330, turn, includes one or more containers (depicted in FIG. 3 as containers 370(1)-(N)). Similarly, backup server 310 and deduplication storage server 320 are able to store containers not only in MSDP 330, but also in cloud storage system 340. To this end, cloud storage system 340 includes one or more cloud storage units (an example of which is depicted in FIG. 3 as a cloud storage unit 380). In turn, cloud storage units such as cloud storage unit 380 provide storage for cloud deduplication pools (an example of which is depicted in FIG. 3 as a cloud deduplication pool 385). As depicted in FIG. 3, cloud deduplication pool 385 includes a number of containers (depicted in FIG. 3 as containers 390(1)-(N)), in the manner of containers 370(1)-(N), the obvious distinction being storage of containers 390(1)-(N) in cloud storage system 340. In a manner comparable to that depicted in FIG. 1, containers such as containers 390(1)-(N) can include metadata (an example of which is depicted in FIG. 3 as metadata store 394) and deduplicated data (an example of which is depicted in FIG. 3 as deduplicated data store 396).

Of concern in such scenarios, with regard to containers 390(1)-(N), is the fact that fragmentation and low usage efficiency of such containers can result in the excessive use of storage resources, as well as the problems related to inefficient restoration mentioned earlier. In the case of containers 370, compaction can be performed by deduplication storage server 320, for example. In the example depicted in FIG. 3, such operations entail the reading (and subsequent storage, in the case of compaction) of such containers. In view of the relatively tight coupling between deduplication storage server 320 and MSDP 330, the implications as to communication bandwidth are typically not of concern. However, with respect to containers in cloud deduplication pool 385, the network bandwidth consumed by compaction operations can quickly become problematic, as noted. Unfortunately, in a restoration scenario, allowing backup images to remain spread across a large number of containers results in the need to retrieve that large number of containers from cloud storage (e.g., where the containers, and so their data segments, are managed as monolithic units), detrimentally affecting computing and communication resources, and slowing restoration operations unacceptably.

It is in such scenarios that methods and systems such as those described herein can be put to advantageous use. When a container (e.g., such as one of containers 390, or of containers 370) begins to suffer from fragmentation (which is, in effect, the stored backup images becoming more and more spread out among the containers), and compaction is problematic, determinations such as those described herein can be made by space reclamation module 362. In so doing, space reclamation module 362 identifies one or more containers using the appropriate criteria, and performs reclamation with respect thereto, in a manner such as that described subsequently. As noted elsewhere herein, such criteria can include and absolute amount of data segments stored in the container that are currently in use, a proportion or percentage of data in the container that is currently in use, and/or the like. Additional criteria that can be considered includes the average age of in-use data in the given container, the time at which the container (or backup image) was last accessed, the number of data segments accessed within a given period, and other such criteria.

Examples of Processes for Efficient Space Reclamation in Deduplication Systems

Figure 4:
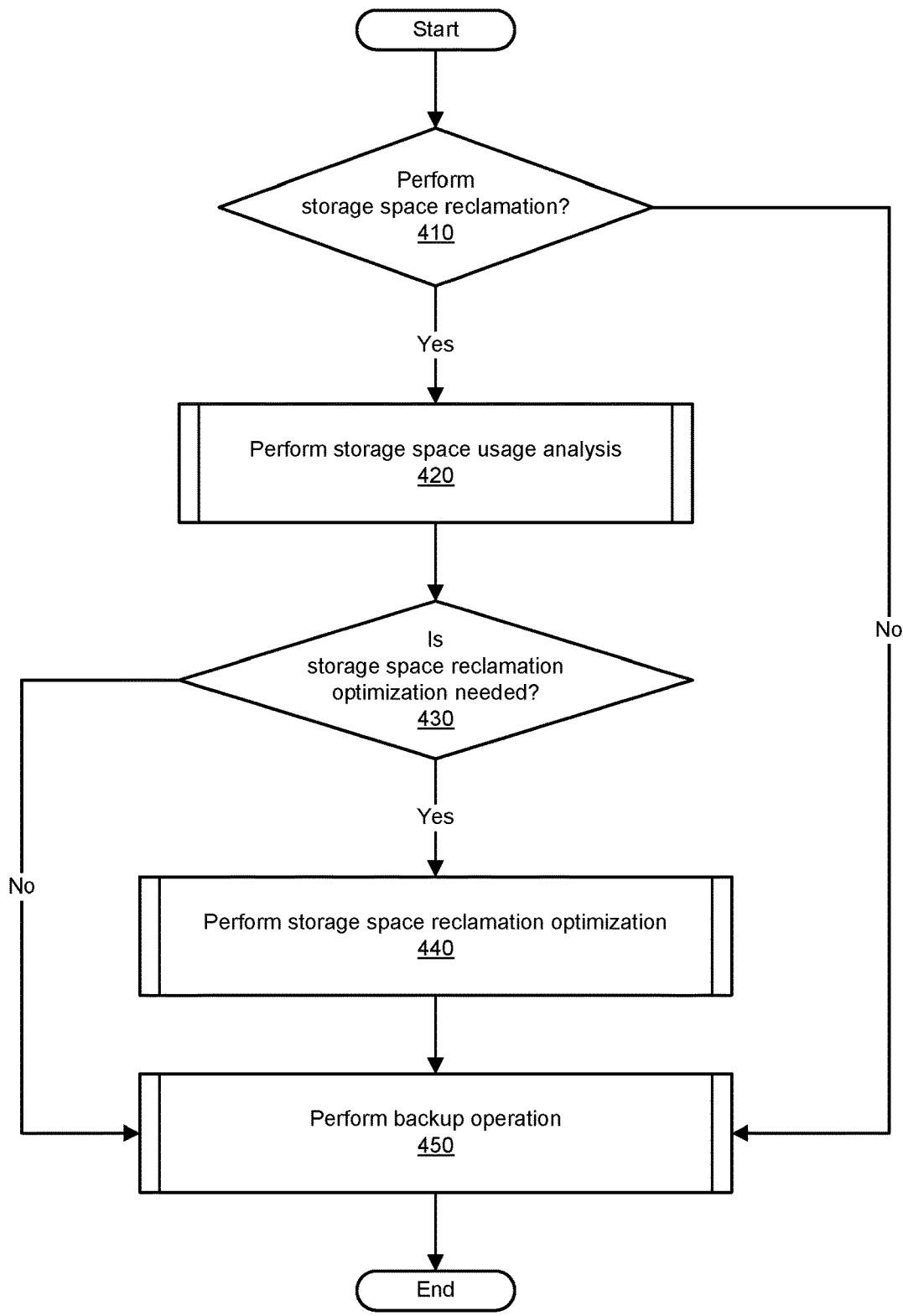
FIG. 4 is a flowchart illustrating an example of a backup process implemented in a deduplication system, according to one embodiment.

FIG. 4 is a flowchart illustrating an example of a reclamation and backup process implemented in a deduplication system, according to one embodiment. A reclamation and backup process 400, as depicted in FIG. 4, begins with a determination as to whether to perform a storage space reclamation optimization operation (410). Such a determination can be made in association with the initiation of a backup process, as a result of continuous monitoring of the condition (with regard to the aforementioned criteria), on a periodic basis, and/or using other appropriate techniques. Thus, as will be appreciated in light of the present disclosure, reclamation and backup process 400 is illustrated as being performed as part of a backup process, as depicted in FIG. 4, but other approaches (e.g., such as being performed at periodic, regular intervals) can be employed. Alternatively, such a process can be performed upon the occurrence of a given event, such as a maximum storage level, during periods of inactivity, and/or as the results of other such events and situations.

Next, storage space usage analysis is performed (420). Such storage space usage analysis can be performed, for example, by an analysis module such as analysis module 220, by interfacing with the appropriate metadata via metadata interface such as metadata interface module 210. A determination is then made as to whether storage space reclamation or optimization thereof is needed (e.g., by analysis module 220), based on a result of the storage space usage analysis (430). If storage space reclamation (optimization) is needed, storage space reclamation optimization operations are commenced (440). Such storage space reclamation optimization operations can be performed, for example, by a reclamation module such as reclamation module 230. Upon their conclusion, if the reclamation process is performed as part of a backup operation, the backup operation in question is performed (450). As noted elsewhere herein, such can be the case in certain embodiments, for example, where existing backups (e.g., as constituted by data segments stored in containers (e.g., in the cloud)) are not deleted, but the fingerprints of the data segments of the containers thus identified are filtered from results from a central fingerprint index that are sent to one or more clients. In such a case, the clients (re)send data segments corresponding to the omitted fingerprints as part of the backup operation performed, thereby resulting in the data segments of that backup operation having better locality that would otherwise be the case. Otherwise, if storage space usage analysis indicates that storage space reclamation optimization need not be performed (430), reclamation and backup process 400 proceeds directly to performing the requisite backup operation, in which case the given backup operation proceeds normally (e.g., with all fingerprints from the central fingerprint index being sent to the client(s), thereby preventing the existing data segments from being (re)sent), for example (450). In either case, once the desired backup operation has completed, the process concludes.

Figure 5:
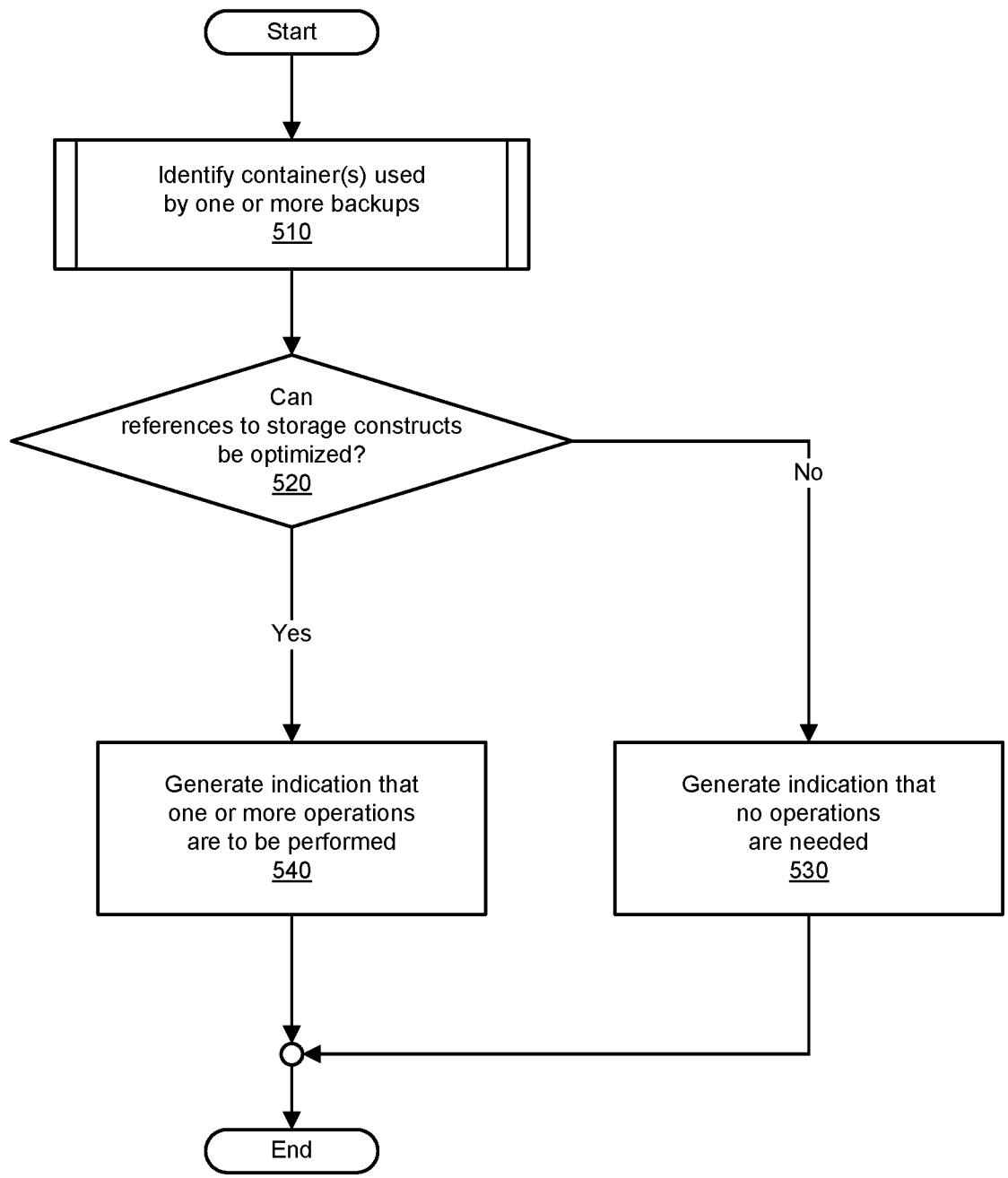
FIG. 5 is a flowchart illustrating an example of a storage space usage analysis process implemented in a deduplication system, according to one embodiment.

FIG. 5 is a flowchart illustrating an example of a storage space usage analysis process in the manner of the storage space reclamation optimization implemented in the deduplication system process described in connection with FIG. 4, according to one embodiment, and performed by an analysis module such as analysis module 220. That being the case, a storage space usage analysis process 500 is depicted in FIG. 5. Storage space usage analysis process 500 begins with a process of identifying one or more containers used by one or more of the backup images in question (such that might be candidates for reclamation optimization operations) (510). A determination is then made as to whether the process for identifying containers (e.g., as candidates for optimization, in need of reclamation, or the like) has successfully identified any such containers (520). If none of the containers thus analyzed are determined to be candidates, storage space usage analysis process 500 generates an indication to the effect that no optimization or other reclamation operations are needed (530). The process then concludes.

Alternatively, if one or more containers are identified as candidates (e.g., for optimization (of references to their data segments, for example), reclamation, or the like) (520), storage space usage analysis process 500 generates an indication that one or more optimization or other reclamation operations are needed (540). As before, the process then concludes.

Figure 6:
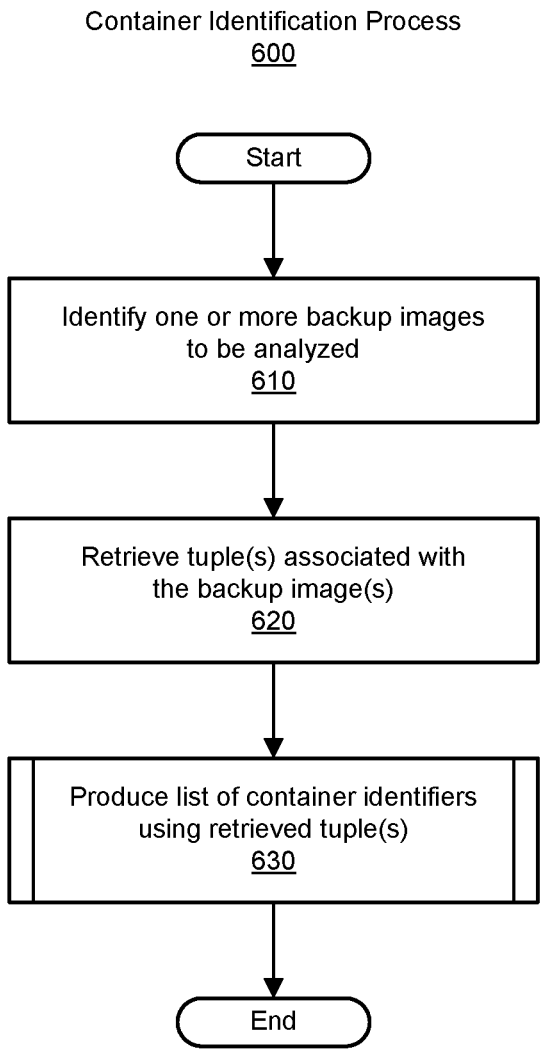
FIG. 6 is a flowchart illustrating an example of a container identification process implemented in a deduplication system, according to one embodiment.

FIG. 6 is a flowchart illustrating an example of a container identification process implemented in a deduplication system, according to one embodiment. To this end, FIG. 6 depicts a container identification process 600. Container identification process 600 is an example of the identifying of containers for reclamation described in connection with FIG. 5. Here again, such identification can be performed by an analysis module such as analysis module 220, which can interface with the metadata in containers such as containers 370 and/or containers 390. Container identification process 600 begins with the identification of one or more backup images that are to be analyzed (610). Once one or more backup images have been identified for analysis, one or more tuples associated with the backup image(s) are retrieved (620). Each such tuples can be, for example, a triple that includes a storage construct identifier (e.g., a container identifier), a unique identifier for each unit of data (e.g., a fingerprint or other such hash value), and the size of the given unit of data (e.g., an associated size value). Once the requisite tables associated with the backup image(s) has/have been retrieved, a list of container identifiers can be produced using those retrieved tuples (630). Container identification process 600 then concludes.

Figure 7:
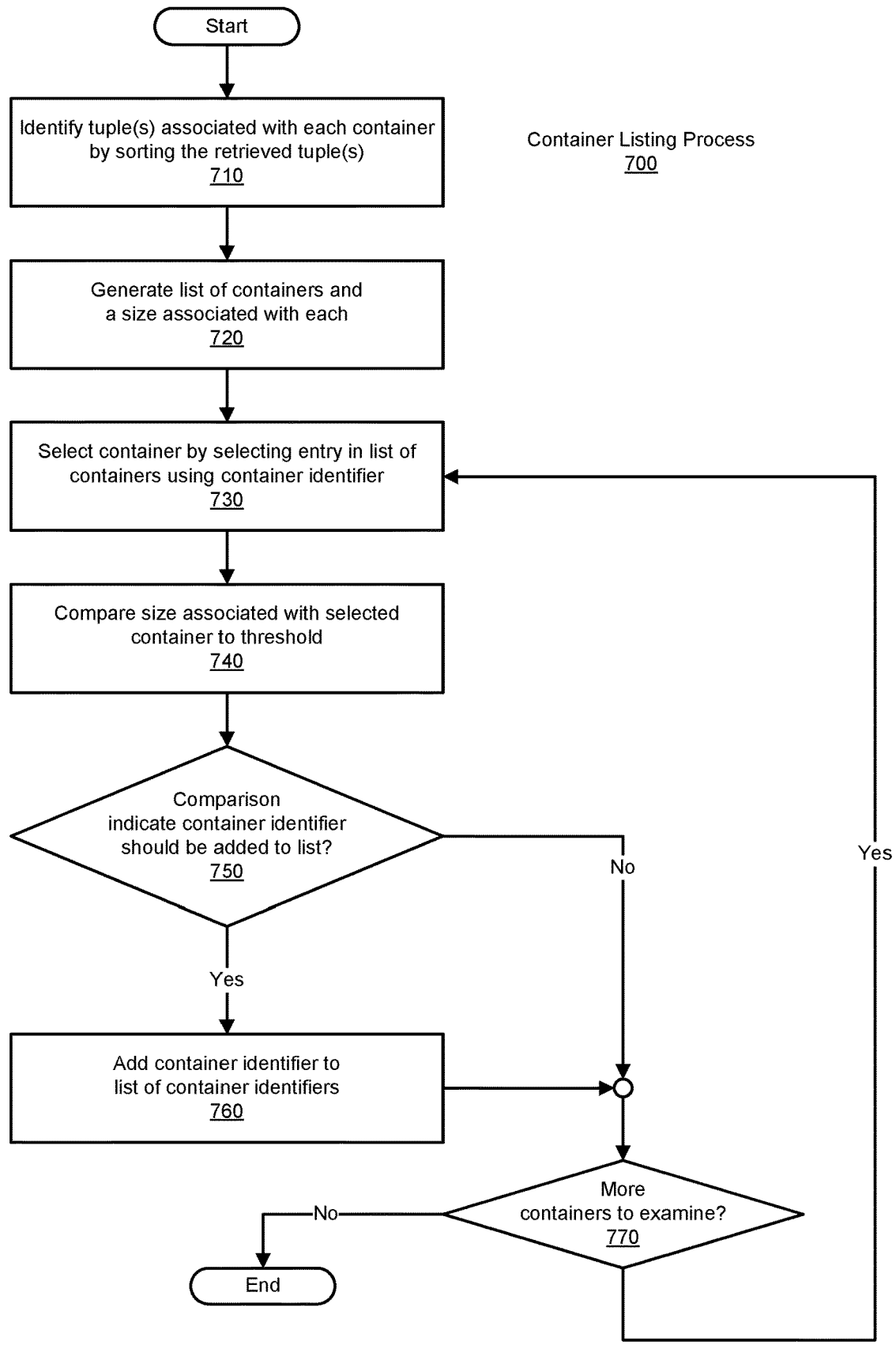
FIG. 7 is a flowchart illustrating an example of a container listing process implemented in a deduplication system, according to one embodiment.

FIG. 7 is a flowchart illustrating an example of a container listing process implemented in a deduplication system, according to one embodiment. FIG. 7 thus depicts a container listing process 700. Container listing process 700 is an example of the process noted in FIG. 6, with respect to the production of a list of container identifiers, produced using the tuples retrieved in earlier operations, and can again be performed as part of the operations performed by analysis module 220. Container listing process 700 begins with the identification of tuples associated with each container (710). These tuples can be identified, for example, by sorting the retrieved tuples. Such sorting can be accomplished based on a size associated with each data segment, as noted earlier. The tuples associated with each container having been identified, a list of containers and the size of in-use data in each container (or conversely, the size of unused data in each container) can be generated (720). Each container identified in the list of container identifiers can now be analyzed.

At this juncture, the list of container identifiers can be analyzed by selecting entries (e.g., in order), and making a determination as to whether the container represented by the given entry should be the subject of reclamation operations (e.g., whether the fingerprints of the data segments of the given container(s) should be withheld from fast fingerprint identification operations by way of filtering central fingerprint index information sent to clients). In this regard, an entry in the list of containers is selected using the container identifier (730). The size associated with the container corresponding to the selected entry is then compared to a threshold (740). As noted elsewhere herein, such size information can represent, for example, the number of data segments of the last number of full backup cycles in the container, which remain in-use. A determination is then made as to whether the comparison performed indicates that reclamation should be performed/allowed to occur (e.g., by ceasing to reference data segments in the given container for new backups, thereby reducing the number of containers in use over time) (750). If the analysis performed (e.g., as by the comparison performed) indicates that the data segments of the container in question should no longer be referenced for new backups (or otherwise reclaimed), container listing process 700 proceeds with adding the container identifier to the list of containers to be reclaimed (e.g., the list of containers whose data segments will not be referenced in the future backups) (760). Container listing process 700 then proceeds to a determination as to whether the list of containers contains further containers to be examined (770). Alternatively, if the comparison indicates that no action is to be taken with respect to the given container (e.g., that the container's data segments can continue to be referenced by future backup operations) (750), container listing process 700 proceeds directly to the determination as to whether additional containers remain to be examined (770). In either case, if additional containers in the container list remain to be examined, container listing process 700 returns to select the next entry in the list of containers, and proceeds with the analysis of the information for the container represented by that entry. Once the entries in the list of containers have been processed, container listing process 700 concludes.

Figure 8:
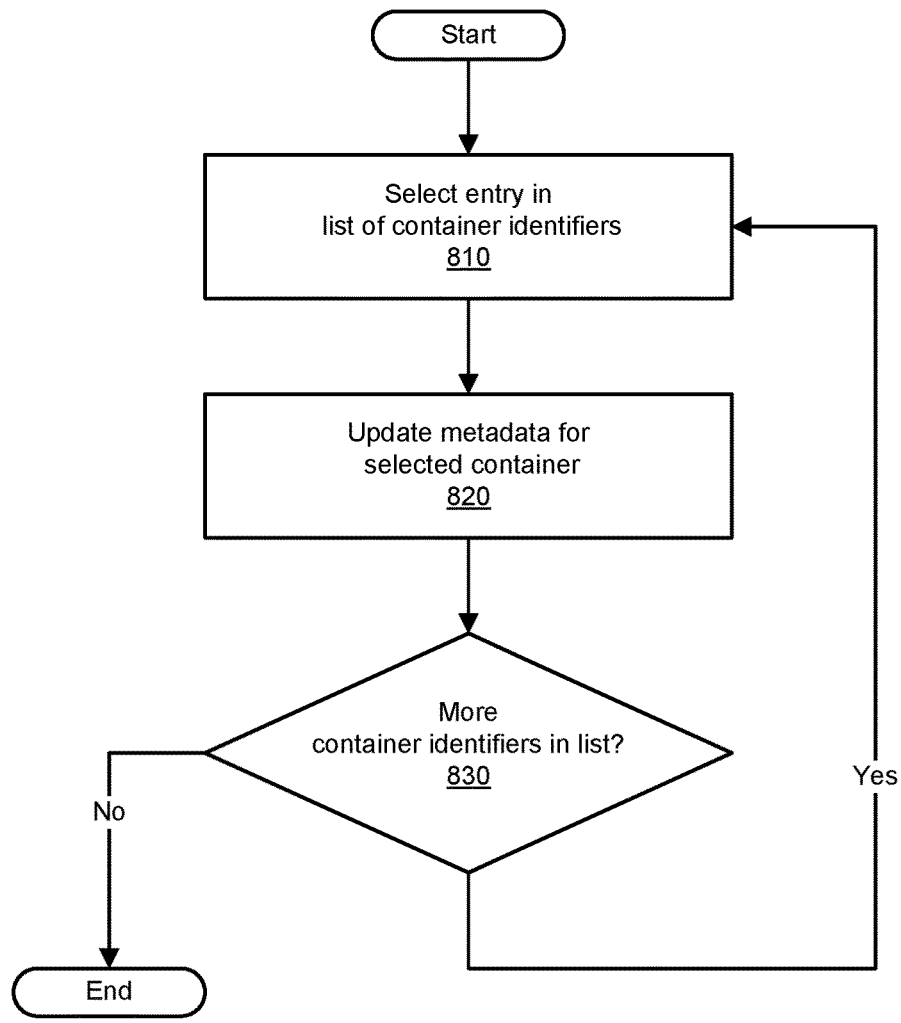
FIG. 8 is a flowchart illustrating an example of an container reclamation operation process implemented in a deduplication system, according to one embodiment.

FIG. 8 is a flowchart illustrating an example of an container reclamation operation process implemented in a deduplication system, according to one embodiment. FIG. 8 thus depicts a container reclamation operation process 800. As will be appreciated, container reclamation operation process 800 is an example of the storage space reclamation (optimization) described in connection with FIG. 4, and can be carried out, for example, by a reclamation module such as reclamation module 230 of FIG. 2. Container reclamation operation process 800 begins with the selection of an entry in the list of containers to be reclaimed (e.g., the containers for which data segment fingerprint(s) are to be removed from fingerprint indexing), which was generated by the aforementioned storage space usage analysis process performed earlier in reclamation and backup process 400 of FIG. 4, as well as the sub-processes thereof (810). The selection of this entry represents the identification of a container that is to be subjected to reclamation operation(s), and thus, metadata for the selected container can be updated (e.g., fingerprint indexing for the affected data segments (i.e., those in the container in question) are updated) (820). The metadata thus updated can be information such as that stored in metadata store 157, metadata store 394, the main index cache of deduplication server 140, or other such metadata stores. A determination is then made as to whether further containers remained in the list of containers that are to be reclaimed (830). If further containers remain in the list of containers, container reclamation operation process 800 iterates to the selection of the next container to be reclaimed (810). Alternatively, if no further containers remain for reclamation, container reclamation operation process 800 concludes. As will be appreciated in light of the present disclosure, container reclamation operation process 800 does not perform filtering, which is the subject of and is described in connection with FIG. 9.

Figure 9:
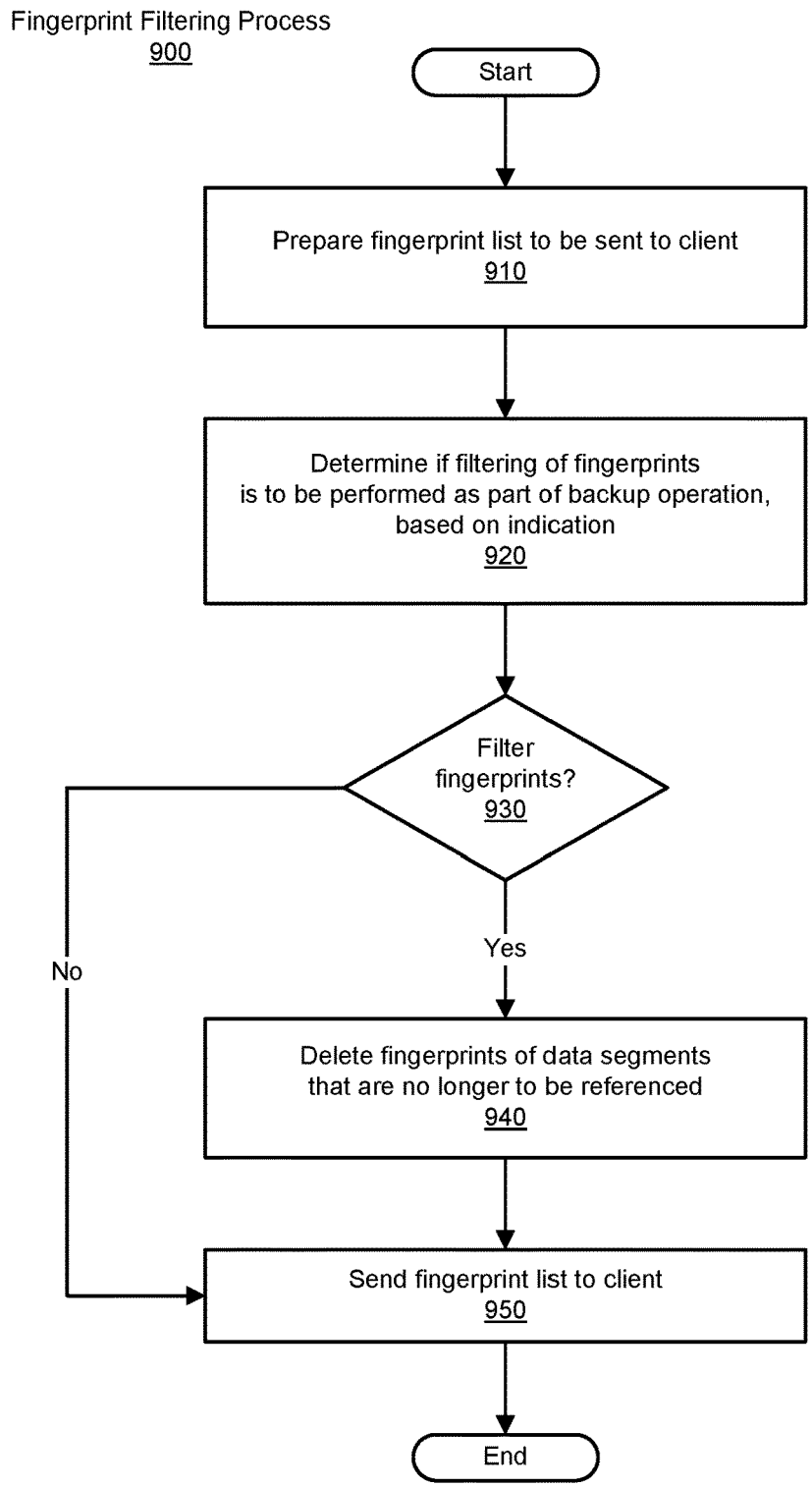
FIG. 9 is a flowchart illustrating an example of a fingerprint filtering process implemented in a deduplication system, according to one embodiment.

FIG. 9 is a flowchart illustrating an example of a fingerprint filtering process implemented in a deduplication system, according to one embodiment. FIG. 9 thus depicts a fingerprint filtering process 900, which can be performed by deduplication server 140, for example. As will be appreciated in light of the present disclosure, and particularly with respect to FIG. 4 and reclamation and backup process 400, the reclamation of one or more containers can be achieved (and/or reflected by) changes made to metadata such as that maintained in a fingerprint cache used by a deduplication system (or that such a deduplication system provides to clients indicating data segments already stored), which then result in the sending by such clients of such data segments during subsequent backup operations. Further, the "deletion" of storage constructs such as storage objects (e.g., containers) can, in certain embodiments, be effected by the removal of identifiers such as hash values (e.g., fingerprints) from results produced by deduplication systems, presented for use by client systems (e.g., when provided as results from a search of a main index cache such as the main index cache of deduplication server 140). That being the case, fingerprint filtering process 900, in essence, removes fingerprints from a list of fingerprints being sent to one or more clients for use in determining whether data segments already exist in the deduplication pool (i.e., whether the client's data segments have already been transmitted to the deduplication system). As a result, a determination is made by the client that the data segments (for which fingerprints are not provided, as a result of their removal) do not exist in the container(s) in question, which then results in the client sending the data segment in question (and their associated fingerprints) to deduplication storage server 140, which stores such data in a new container (e.g., a new cloud container), providing the benefits and advantages described elsewhere herein.

In order to accomplish the aforementioned objective, fingerprint filtering process 900 begins with the preparation of a fingerprint list to be sent to the client (910). A determination is then made as to whether filtering of fingerprints is to be performed as part of the backup operation, based on the indication generated earlier (920). If they list of fingerprints is to be filtered (930), fingerprint filtering process 900 proceeds with the removal of fingerprints of the data segments that are no longer to be referenced (940). The fingerprint list, having been filtered, is then sent to the requesting client (950). Alternatively, if fingerprint filtering has not been indicated (930), fingerprint filtering process 900 proceeds directly to sending the unaltered fingerprint list to the client (950).

In either case, fingerprint filtering process 900 then concludes.

An Example Computing and Network Environment

As shown above, the systems described herein can be implemented using a variety of computer systems and networks. Examples of such computing and network environments are described below with reference to FIGS. 10 and 11.

Figure 10:
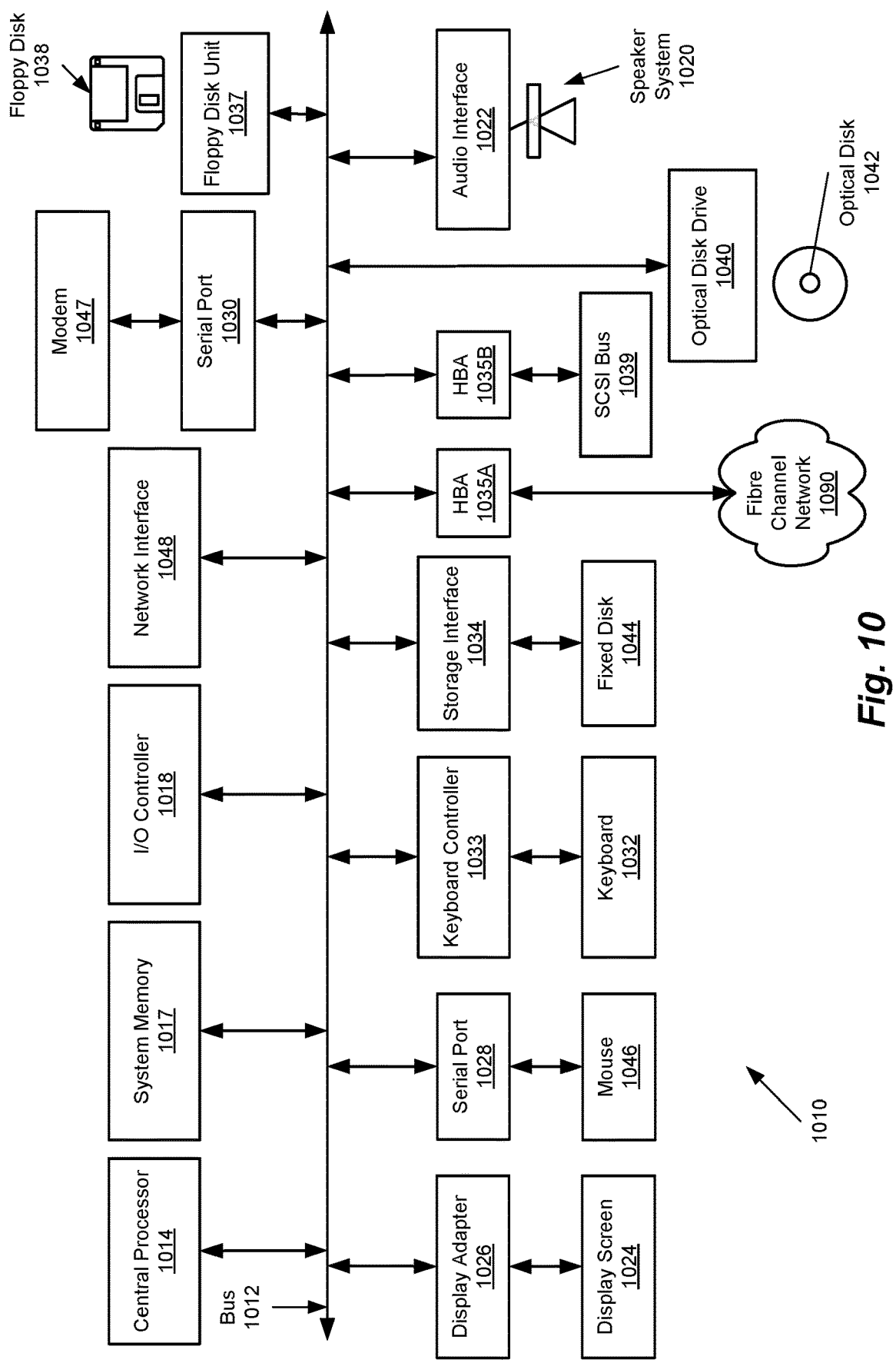
FIG. 10 is a simplified block diagram illustrating components of an example computer system suitable for implementing embodiments of the present disclosure, according to one embodiment.

FIG. 10 depicts a block diagram of a computer system 1010 suitable for implementing aspects of the systems described herein, and the like. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1022 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1022), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1010 are generally stored on and accessed from a computer-readable storage medium, such as a hard disk drive (e.g., fixed disk 1044), an optical drive (e.g., optical drive 1040), a floppy disk unit 1037, or other computer-readable storage medium.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the systems described herein. The devices and subsystems can be interconnected in different ways from that shown in FIG. 10. The operation of a computer system such as that shown in FIG. 10 is readily known in the art and is not discussed in detail in this application. Code to implement the modules of the systems described herein can be stored in computer-readable storage media such as one or more of system memory 1017, fixed disk 1044, optical disk 1042, or floppy disk 1038. The operating system provided on computer system 1010 may be MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 1016, fixed disk 1044, CD-ROM 1042, or floppy disk 1038. Additionally, computer system 1010 may be any kind of computing device, and so includes personal data assistants (PDAs), network appliance, X-window terminal or other such computing device. The operating system provided on computer system 1010 may be MS-DOS®, MS-WINDOWS®, UNIX®, Linux® or other known operating system. Computer system 1010 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
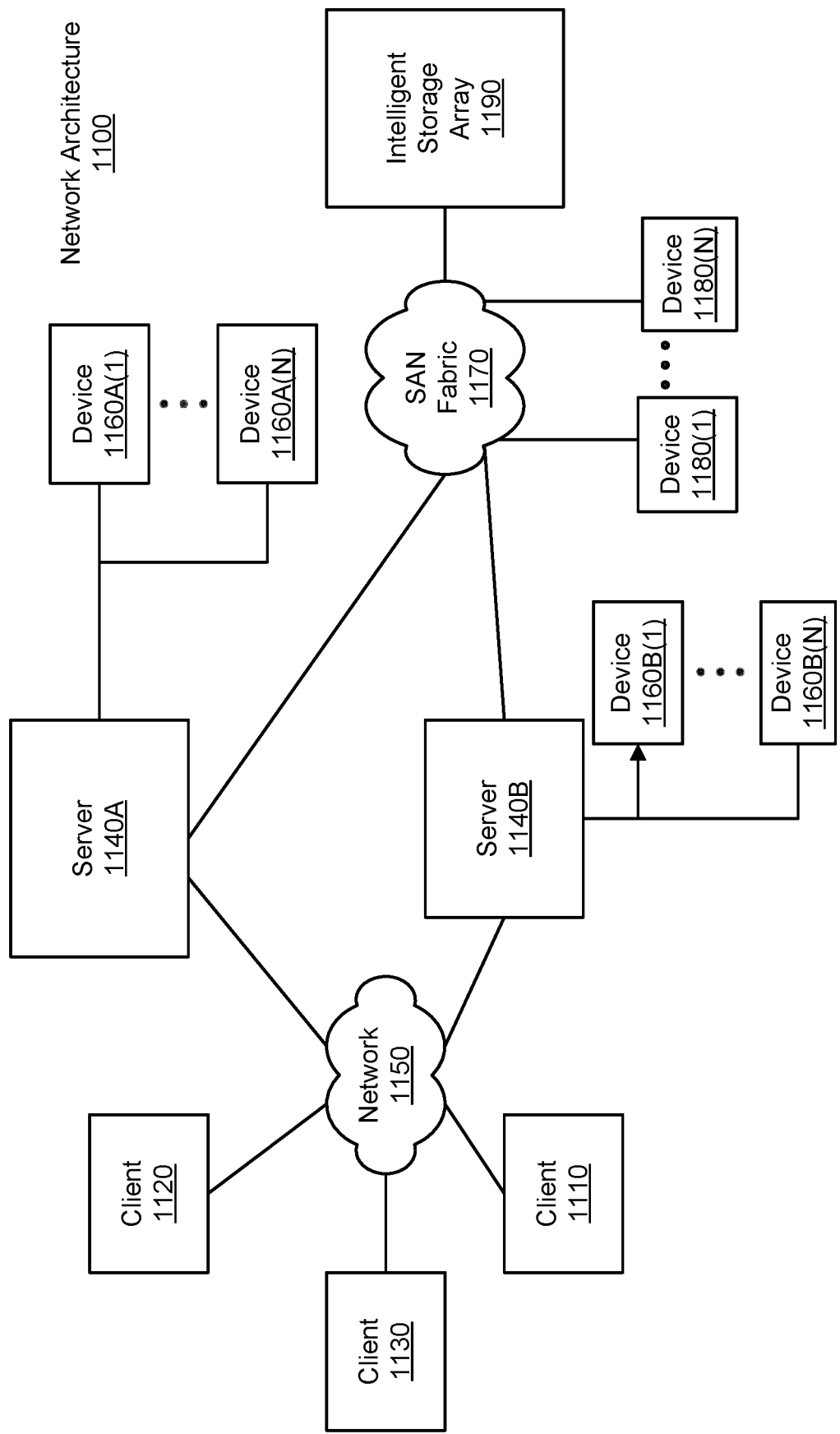
FIG. 11 is a simplified block diagram illustrating components of an example computer system suitable for implementing embodiments of the present disclosure, according to one embodiment.

FIG. 11 is a block diagram depicting a network architecture 1100 in which client systems 1110, 1120 and 1130, as well as storage servers 1140A and 1140B (any of which can be implemented using computer system 1110), are coupled to a network 1150. Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation. SAN fabric 1170 supports access to storage devices 1120(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1120(1)-(N) or intelligent storage array 1190. FIG. 11 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1010, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

OTHER EMBODIMENTS

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
   deduplicating a first unit of data to an existing de-duplicated storage construct of a plurality of existing de-duplicated storage constructs, wherein each of the plurality of existing de-duplicated storage constructs comprises
   metadata,
   a plurality of units of data, and
   the metadata includes a signature construct uniquely identifying the data contained in each of the plurality of units of data;
   after deduplicating the first units of data, designating the existing de-duplicated storage construct for reclamation at least in part, by
   determining a portion of the plurality of units of data of the existing de-duplicated storage construct that is in a given state, wherein
   the given state is one of in-use or unused, and
   the determining is based, at least in part, on at least a portion of the metadata of the existing de-duplicated storage construct, and
   comparing an amount of data to a threshold value, wherein
   the amount of data represents the portion of the plurality of units of data of the existing de-duplicated storage construct in the given state; and
   in response to the comparing, generating an indication that a reclamation operation is to be performed with respect to the existing de-duplicated storage construct, wherein
   the reclamation operation comprises re-deduplicating the first unit of data to another de-duplicated storage construct.

2. The method of claim 1, wherein
   each of the plurality of existing de-duplicated storage constructs is a container, each of the units of data is a data segment,
   the method further comprises
   in response to the indication, deallocating the existing de-duplicated storage construct.

3. The method of claim 2, wherein
   the plurality of existing de-duplicated storage constructs are among a set of storage constructs stored in a storage system,
   the plurality of existing de-duplicated storage constructs represent one or more backup images, and the one or more backup images were created during one or more full backup cycles.

4. The method of claim 3, wherein
   the one or more full backup cycles comprises a plurality of full backup cycles, and
   each of the plurality of full backup cycles comprises a full backup and one or more incremental backups.

5. The method of claim 1, wherein the plurality of existing de-duplicated storage constructs represent one or more backup images, and the identifying further comprises:
   identifying the one or more backup images, wherein
   the one or more backup images were created during one or more full backup cycles;
   retrieving a plurality of tuples associated with the one or more backup images, wherein
   each tuple is associated with a data segment of the one or more backup images and is one of a plurality of tuples comprised in metadata of a container in which the data segment is stored, and
   the plurality of tuples are retrieved from metadata of one or more containers in which the data segments are stored; and
   producing a list of container identifiers, using the plurality of tuples, wherein
   each container identifier in the list of container identifiers identifies a container with respect to which a reclamation operation is to be performed.

6. The method of claim 5, wherein the producing the list of container identifiers comprises:
   generating a list of pairs, wherein
   each pair in the list of pairs comprises
   a container identifier identifying one of a plurality of containers, and
   container size information indicating a size of the portion of the one of the plurality of containers; and
   generating the list of container identifiers, wherein
   the list of container identifiers is generated based, at least in part, on the list of pairs.

7. The method of claim 6, wherein the generating the list of container identifiers comprises:
   comparing the container size information for the one of the plurality of containers to a threshold; and
   in response to a result of the comparing that indicates that the one of the plurality of containers should be reclaimed, including the container identifier in the list of container identifiers.

8. The method of claim 6, further comprising:
   sorting the plurality of tuples, wherein
   each tuple of the plurality of tuples is a triple, and
   each triple comprises
   a container identifier,
   a fingerprint of the data segment, and
   size information, wherein
   the size information is a size of the data segment.

9. The method of claim 8, wherein
   the sorting the plurality of tuples sorts the plurality of tuples using
   the container identifier of each tuple as a primary key, and
   the fingerprint of the data segment as a secondary key, wherein
   the size of the data segment is represented by the fingerprint of the data segment.

10. The method of claim 8, wherein
    the plurality of tuples are sorted based, at least in part, on the size information of each of the plurality of tuples.

11. The method of claim 8, further comprising:
in response to the indication, performing the reclamation operation, wherein
the reclamation operation comprises
removing fingerprints for data segments in the de-duplicated storage construct from a fingerprint cache.

12. The method of claim 8, further comprising:
in response to the indication, excluding fingerprints for data segments in the de-duplicated storage construct, wherein
the fingerprints are in a set of fingerprints, and
the set of fingerprints are sent to a client as part of a backup operation.

13. The method of claim 1, further comprising:
in response to the indication, performing the reclamation operation, wherein
the reclamation operation results in one or both of
associated metadata being updated to indicate that the existing de-duplicated storage construct no longer contains in-use data, wherein
the associated metadata is associated with the existing de-duplicated storage construct, and
the associated metadata is at least one of
the metadata of the de-duplicated storage construct, and/or
other metadata, or
the existing de-duplicated storage construct being deleted.

14. The method of claim 1, wherein the indication indicates that the existing de-duplicated storage construct is to be reclaimed by virtue of:
indicating that a deduplication storage server should perform a reclamation operation, wherein
the reclamation operation comprises deletion of the existing de-duplicated storage construct.

15. A computer program product comprising:
a plurality of instructions, comprising
a first set of instructions, executable on a computer system, configured to designate an existing de-duplicated storage construct of a plurality of existing de-duplicated storage constructs, wherein each of the existing de-duplicated plurality of storage constructs comprises
metadata,
a plurality of units of data, and
the metadata includes a signature construct uniquely identifying the data contained in each of the plurality of units of data, and
the first set of instructions identifies the existing de-duplicated storage construct that is to be reclaimed, at least in part, by
determine a portion of the plurality of units of data of the existing de-duplicated storage construct that is in a given state,
wherein
the given state is one of in-use or unused, and
the determining is based, at least in part, on at least a portion of the metadata of the existing de-duplicated storage construct, and
compare an amount of data to a threshold value, wherein
the amount of data represents the portion of the plurality of units of data of the existing de-duplicated storage construct in the given state, and a second set of instructions, executable on the computer system, configured to, in response to the comparing, generate an indication that a reclamation operation is to be performed with respect to the existing de-duplication storage construct, wherein
the reclamation operation comprises re-deduplicating data; and
a non-transitory computer-readable storage medium, wherein the first and second sets of instructions are encoded in the non-transitory computer-readable storage medium.

16. The computer program product of claim 15, wherein the instructions further comprise:
a third set of instructions, executable on the computer system, configured to identify the plurality of existing de-duplicated storage constructs, wherein
the each of the plurality of existing de-duplicated storage constructs is a container,
each of the units of data is a data segment,
the plurality of existing de-duplicated storage constructs are among a set of storage constructs stored in a storage system,
the plurality of existing de-duplicated storage constructs represent one or more backup images, and
the one or more backup images were created during one or more full backup cycles; and
a fourth set of instructions, executable on the computer system, configured to, in response to the indication, deallocate the existing de-duplicated storage construct.

17. The computer program product of claim 16, wherein the instructions further comprise:
a fifth set of instructions, executable on the computer system, configured to identify the one or more backup images;
a sixth set of instructions, executable on the computer system, configured to retrieve a plurality of tuples associated with the one or more backup images, wherein
each tuple is associated with a data segment of the one or more backup images and is one of a plurality of tuples comprised in the metadata of a container in which the data segment is stored, and
the plurality of tuples are retrieved from metadata of one or more containers in which the data segments are stored; and
a seventh set of instructions, executable on the computer system, configured to sort the plurality of tuples.

18. The computer program product of claim 17, wherein the instructions further comprise:
a eighth set of instructions, executable on the computer system, configured to generate a list of pairs, wherein
each pair in the list of pairs comprises
a container identifier identifying one of a plurality of containers, and
container size information indicating a size of the portion of the one of the plurality of containers; and
an ninth set of instructions, executable on the computer system, configured to generate a list of container identifiers, wherein
the list of container identifiers is generated based, at least in part, on the list of pairs.

19. The computer program product of claim 15, wherein the instructions further comprise:
a third set of instructions, executable on the computer system, configured to, in response to the indication, perform the reclamation operation, wherein the reclamation operation results in one or both of
    associated metadata being updated to indicate that
        the existing de-duplicated storage construct no
        longer contains in-use data, wherein
        the associated metadata is associated with the existing de-duplicated storage construct, and
        the associated metadata is at least one of
            the metadata of the existing de-duplicated storage
                construct, and/or
            other metadata, or
        the existing de-duplicated storage construct being
            deleted.
20. A computer system comprising:
one or more processors;
a computer-readable storage medium coupled to the one
    or more processors; and
a plurality of instructions, encoded in the computer-readable storage medium and configured to cause the
    one or more processors to
    designate an existing de-duplicated storage construct of
        a plurality of existing de-duplicated storage constructs that should be reclaimed, wherein
        each of the plurality of existing de-duplicated storage
            constructs comprises metadata,
        a plurality of units of data, and
        the metadata includes a signature construct uniquely
            identifying the data contained in each of the
            plurality of unites of data, and
    the instructions configured to cause the one or more
        processors to identify the existing de-duplicated
        storage construct that is to be reclaimed comprise
        one or more instructions configured to
    determine a portion of the plurality of units of data
        of the existing de-duplicated storage construct that
        is in a given state, wherein the given state is one
        of in-use or unused,
    the one or more instructions configured to determine
        use at least a portion of the metadata of the
        de-duplicated storage construct, and
    compare an amount of data to a threshold value,
        wherein
        the amount of data represents the portion of the
            plurality of units of data of the existing de-duplicated storage construct in the given state, and
    in response to an indication that the existing de-duplicated storage construct should be reclaimed, generate an indication that a reclamation operation is to be
        performed with respect to the existing de-duplicated
        storage construct, wherein
the reclamation operation reclaims comprises re-deduplicating the units of data of the existing de-duplication
    storage construct to another de-duplicated storage construct.

* * * * *